United States Patent [19]

Watanabe et al.

[11] Patent Number: 5,304,318

[45] Date of Patent: Apr. 19, 1994

[54] SINTERED FERRITE MATERIALS AND CHIP PARTS

[75] Inventors: Hideo Watanabe, Chiba; Takashi Suzuki; Kikuko Yoshizoe, both of Ichikawa, all of Japan

[73] Assignee: TDK Corporation, Tokyo, Japan

[21] Appl. No.: 37,673

[22] Filed: Mar. 25, 1993

Related U.S. Application Data

[63] Continuation of Ser. No. 305,021, Feb. 2, 1989, abandoned.

[30] Foreign Application Priority Data

Feb. 3, 1988 [JP] Japan .................................. 63-23469

[51] Int. Cl.$^5$ ............................................. C04B 35/26
[52] U.S. Cl. ............................. 252/62.61; 252/62.59
[58] Field of Search .......................... 252/62.61, 62.59

[56] References Cited

U.S. PATENT DOCUMENTS

| | | | |
|---|---|---|---|
| 2,773,039 | 12/1956 | Schoenberg | 252/62.61 |
| 3,123,748 | 3/1964 | Brownlow | 252/62.5 |
| 3,177,145 | 4/1965 | Brownlow | 252/625 |
| 3,553,135 | 1/1971 | Baba et al. | 252/62.59 |
| 3,609,084 | 9/1971 | Loye | 252/62.59 |
| 3,644,207 | 2/1972 | Baba et al. | 252/62.59 |
| 4,169,028 | 9/1979 | Yokoyama et al. | 262/62.56 |
| 4,232,061 | 11/1980 | Hattori et al. | 252/62.59 |
| 4,277,356 | 7/1981 | Simonet | 252/62.59 |
| 4,543,198 | 9/1985 | Kamiyama | 252/62.59 |
| 4,598,034 | 7/1986 | Honjo et al. | 252/62.61 |
| 4,808,327 | 2/1989 | Rousset et al. | 252/62.59 |

FOREIGN PATENT DOCUMENTS

| | | | |
|---|---|---|---|
| 47-35759 | 4/1968 | Japan | 252/62.61 |
| 62-29374 | 6/1987 | Japan | |
| 817458 | 7/1959 | United Kingdom | 252/62.61 |
| 1071611 | 6/1967 | United Kingdom | |
| 1296718 | 11/1972 | United Kingdom | |

OTHER PUBLICATIONS

Chemical Abstracts, vol. 102, Jun. 1985, p. 687 abstract no. 214030h Fuji Electrochemical Co., Ltd.
Journal of Materials Science Letters, vol. 6, No. 5, May 1987 pp. 504–506 GB; C. Prakash.
Chemical Abstracts, vol. 84, No. 12, Mar. 1976 abstract no. 83407w Hitachi Metals Ltd.

*Primary Examiner*—Ellen M. McAvoy
*Attorney, Agent, or Firm*—Oblon, Spivak, McClelland, Maier & Neustadt

[57] ABSTRACT

To a ferrite composition of ferric oxide and divalent metal oxides are added 0.01–5.0 mol % of $Li_2O$ and 0.01–0.5 mol % of $TiO_2$, $SnO_2$, and/or $GeO_2$. The ferrite has sufficiently high density, mechanical strength and electromagnetic properties even when it is sintered at a relatively low temperature of up to 950° C.

6 Claims, 2 Drawing Sheets

SINTERED FERRITE MATERIALS AND CHIP PARTS

This application is a continuation of application Ser. No. 07/305,021, filed on Feb. 2, 1989, now abandoned.

BACKGROUND OF THE INVENTION

1. Field of the Invention

This invention relates to sintered ferrite materials useful as various magnetic materials, and more particularly, to sintered ferrite materials which can be produced by sintering at relatively low temperatures. It also relates to chip parts using the same.

2. Prior Art

A variety of sintered ferrites have been used as various magnetic cores, magnetic shields, electromagnetic wave shields, attenuators and the like because of their magnetic properties. Among others, nickel base ferrites including Ni ferrites, Ni-Zn ferrites, and Ni-Cu-Zn ferrites have been widely used as low-temperature sinterable material to which printing and green sheet techniques are applicable.

These sintered ferrite materials are required to have a low sintering temperature, high density, high mechanical strength, and improved electromagnetic properties including magnetic permeability. Prior art ferrite materials, however, must be sintered at a very high temperature of at least about 1,100° C. in order that they reach a sufficient density. High temperature heating undesirably increases the manufacturing expense. If the sintering temperature is not high enough, there results a sintered ferrite material having a commercially unsatisfactory level of density and mechanical strength as well as poor electromagnetic properties including magnetic permeability.

For example, chip inductors are often prepared by simultaneously sintering ferrite and electrode material, and silver is used as the electrode material. Sintering at a temperature in excess of 950° C. would melt silver. This is a serious barrier to the manufacture of chip parts.

Japanese Patent Publication No. 62-29374 (published Jun. 25, 1987) discloses a magnetically soft material exhibiting a consistent, low temperature coefficient and having a spinel type ferrite composition consisting essentially of 45 to 64 mol % of ferric oxide, 10 to 50 mol % of nickel oxide, up to 40 mol % of zinc oxide, and 0.1 to 7 mol % of lithium oxide, said composition ranging from its stoichiometry to a composition having a 5 mol % short of ferric oxide. This material cannot be sintered at relatively low temperatures probably because of the absence of a tetravalent metal oxide requisite to the present invention as will be described below.

SUMMARY OF THE INVENTION

A primary object of the present invention is to provide a novel and improved sintered ferrite material which has a sufficient density and excellent electromagnetic properties including magnetic permeability even when sintered at a relatively low temperature of up to 950° C.

Another object of the present invention is to provide a chip part using such a sintered ferrite material.

According to one aspect of the present invention, there is provided a sintered ferrite material comprising: iron oxide, at least one oxide of a divalent metal M(II) wherein M(II) is selected from the group consisting of nickel and copper, 0.01 to 5.0 mol % calculated as $Li_2O$ of lithium oxide, and 0.01 to 0.5 mol % calculated as $M(IV)O_2$ of at least one oxide of tetravalent metal M(IV) wherein M(IV) is selected from the group consisting of titanium, tin, and germanium.

Preferably, iron oxide is present in an amount of from 45 to 53 mol % calculated as $Fe_2O_3$ and the divalent metal oxide is present in an amount of from 45 to 51 mol % calculated as M(II)O. Molar percents are based on the total moles of the ferrite composition. M(II) may further contain zinc.

According to another aspect of the present invention, there is provided a chip part comprising the sintered ferrite material defined above.

BRIEF DESCRIPTION OF THE DRAWINGS

The above and other objects, features, and advantages of the present invention will be more readily understood from the following description when taken in conjunction with the accompanying drawings, in which.

DETAILED DESCRIPTION OF THE INVENTION

Figure 1:
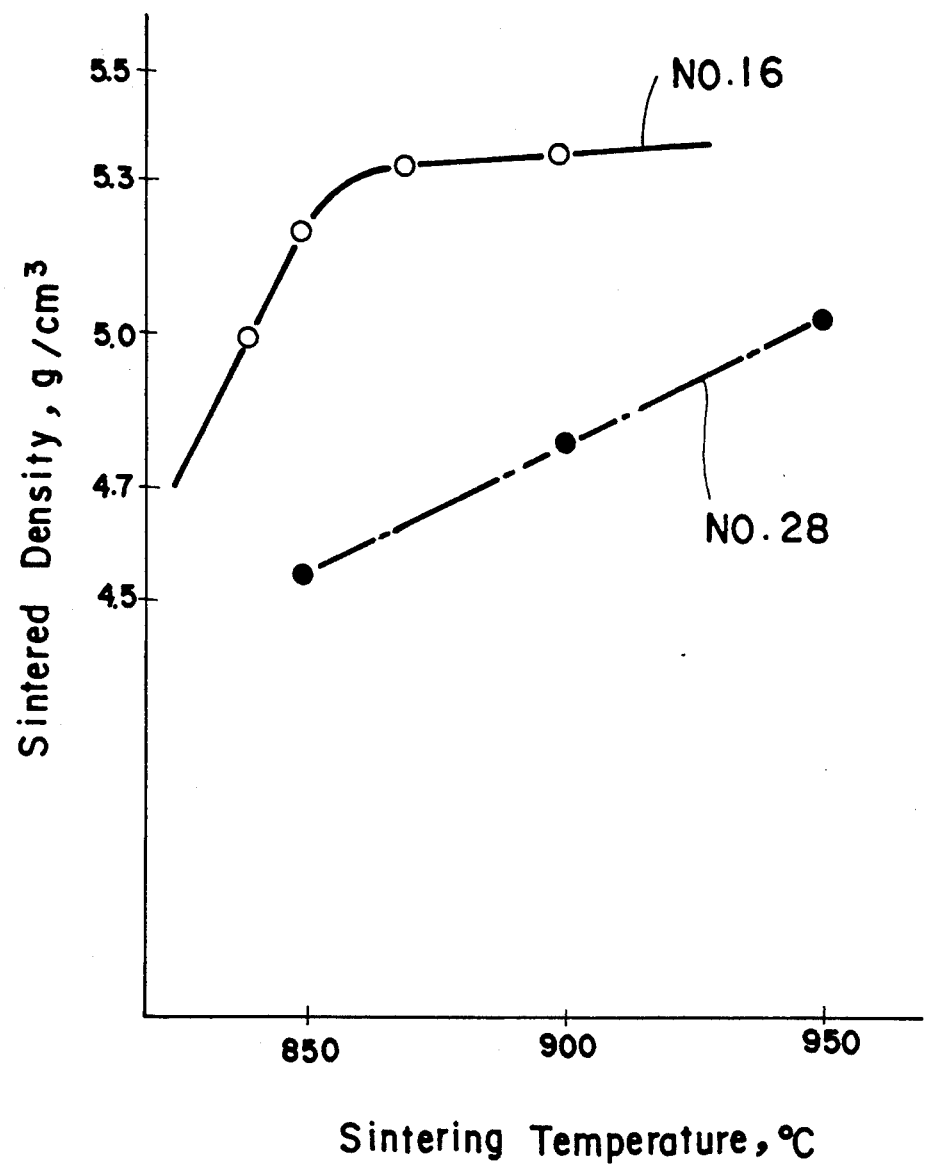
FIG. 1 is a diagram showing the density of present and conventional sintered ferrite materials as a function of sintering temperature.

The present invention provides a sintered ferrite material which contains (i) iron oxide, (ii) a divalent metal M(II) oxide, (iii) lithium oxide, and (iv) a tetravalent metal M(IV) oxide wherein M(II) is at least one element selected from the group consisting of nickel and cobalt, and M(II) may contain zinc, and M(IV) is at least one element selected from the group consisting of titanium, tin, and germanium. In the following description of the content of each component, mol % is based on the total moles of the sintered ferrite composition unless otherwise stated. (i)

Iron oxide is generally ferric oxide and preferably present in the present sintered ferrite material in an amount of from 45 to 53 mol %, more preferably from 45 to 52 mol %, and most preferably from 49 to 51 mol % calculated as $Fe_2O_3$, based on the total moles of the sintered ferrite composition. With less than 45 mol % of iron oxide, there is some likelihood that the content of divalent metal oxide would be increased accordingly, resulting in a loss of magnetic permeability. With more than 53 mol % of iron oxide, there is some likelihood that the ferric oxide content would be more or less excessive and be converted into a hematite phase when sintered at a temperature of 950° C. or lower, also resulting in a loss of magnetic permeability. Contents of ferric oxide in the range of from 49 to 51 mol % are more preferred in that the stoichiometry derives a single phase of spinel structure to achieve high magnetic permeability. (ii)

The oxide of divalent metal M(II) which is contained in the sintered ferrite material of the present invention includes the oxide of nickel and/or cobalt, and may optionally contain zinc. More illustratively, component (ii) is nickel oxide, cobalt oxide, a mixture of nickel and cobalt oxides, a mixture of nickel and zinc oxides, a mixture of cobalt and zinc oxides, or a mixture of nickel, cobalt and zinc oxides. The divalent metal oxide is preferably present in the present sintered ferrite material in a total amount of from 45 to 51 mol %, more preferably from 47 to 50 mol % calculated as M(II)O, based on the total moles of the sintered ferrite composition. Less than 45 mol % of divalent metal oxide has some likelihood that the ferric oxide content be excessive, causing inconvenience as mentioned above. More than 55 mol % of divalent metal oxide can be excessive in some cases, causing a loss of magnetic permeability.

Better results are obtained when the content of divalent metal oxide and iron oxide falls within the following range where the stoichiometry produces a single phase of spinel structure to achieve high magnetic permeability.

When the divalent metal oxide is nickel oxide alone, its content ranges from 45 to 51 mol %, more preferably from 47 to 50 mol % of NiO and at the same time, the content of iron oxide ranges from 45 to 52 mol %, more preferably from 49 to 51 mol % of $Fe_2O_3$.

When the divalent metal oxide is copper oxide alone, its content ranges from 45 to 51 mol %, more preferably from 47 to 50 mol % of CuO and at the same time, the content of oxide ranges from 45 to 52 mol %, more preferably from 49 to 51 mol % of $Fe_2O_3$.

When the divalent metal oxide is a mixture of nickel and copper oxides, their contents range from 10 to 30 mol % of NiO and 20 to 40 mol % of CuO, more preferably from 15 to 25 mol % of NiO and 25 to 35 mol % of CuO, the total amount ranging from 45 to 51 mol %, more preferably from 47 to 50 mol %, and at the same time, the content of iron oxide ranges from 45 to 52 mol %, more preferably from 49 to 51 mol % of $Fe_2O_3$.

When the divalent metal oxide is a mixture of nickel and zinc oxides, their contents range from 20 to 40 mol % of NiO and 10 to 30 mol % of ZnO, more preferably from 25 to 35 mol % of NiO and 15 to 25 mol % of ZnO, the total amount ranging from 45 to 51 mol %, more preferably from 47 to 50 mol %, and at the same time, the content of iron oxide ranges from 45 to 52 mol %, more preferably from 49 to 51 mol % of $Fe_2O_3$.

When the divalent metal oxide is a mixture of copper and zinc oxides, their contents range from 20 to 40 mol % of CuO and 10 to 30 mol % of ZnO, more preferably from 25 to 35 mol % of CuO and 15 to 25 mol % of ZnO, the total amount ranging from 45 to 51 mol %, more preferably from 47 to 50 mol %, and at the same time, the content of iron oxide ranges from 45 to 52 mol %, more preferably from 49 to 51 mol % of $Fe_2O_3$.

When the divalent metal oxide is a mixture of nickel, copper, and zinc oxides, their contents range from 10 to 25 mol % of NiO, 8 to 20 mol % of CuO, and 10 to 30 mol % of ZnO, more preferably from 10 to 20 mol % of NiO, 10 to 15 mol % of CuO, and 15 to 25 mol % of ZnO, the total amount ranging from 45 to 51 mol %, more preferably from 47 to 50 mol %, and at the same time, the content of iron oxide ranges from 45 to 52 mol %, more preferably from 49 to 51 mol % of $Fe_2O_3$. (iii)

Lithium oxide is present in the present sintered ferrite material in an amount of from 0.01 to 5.0 mol %, preferably from 0.05 to 4.0 mol % of $Li_2O$, based on the total moles of the sintered ferrite composition. Less than 0.01 mol % of $Li_2O$ is too low to allow the corresponding composition to be sintered at relatively low temperatures to a high density. More than 5.0 mol % of $Li_2O$ controls sintering reaction to yield a sintered material having a very high temperature coefficient of magnetic permeability. (iv)

The oxide of tetravalent metal M(IV) which is contained in the sintered ferrite material of the present invention includes the oxide of at least one element selected from the group consisting of titanium, tin, and germanium. The tetravalent metal oxide is present in the present sintered ferrite material in a total amount of from 0.01 to 0.5 mol %, more preferably from 0.01 to 0.3 mol % calculated as $M(IV)O_2$, based on the total moles of the sintered ferrite composition. Less than 0.01 mol % of tetravalent metal oxide is too low to allow the corresponding composition to be sintered at relatively low temperatures to a high density. More than 0.5 mol % of tetravalent metal oxide makes it difficult to sinter the corresponding composition, resulting in a drastic drop of Curie temperature.

When more than one tetravalent metal oxide is present, they may be present in any desired proportions.

The addition of lithium oxide (iii) combined with tetravalent metal oxide (iv) is a key to allow ferrite compositions to be sintered at a relatively low temperature.

In addition to the four essential components mentioned above, the sintered ferrite of the present invention may further contain up to 2,000 parts by weight per million parts of the ferrite of niobium oxide, cobalt oxide or the like.

Oxygen is present in substantial stoichiometry with a deviation of ±0.01% from the stoichiometric quantity.

The composition of the sintered ferrite material of the present invention has been described. Only when the ferrite has the above-defined composition, there are obtained the benefits of the invention that the sintered ferrite material has a sufficiently high density, high mechanical strength, and excellent electromagnetic properties including magnetic permeability even when it has been sintered at a relatively low temperature of up to 950° C.

The sintered ferrite material of the present invention may be prepared by any desired methods including conventional ferrite sintering methods.

Most often, the sintered ferrite material of the invention is prepared by selecting oxides corresponding to components (i) to (iv) or compounds which are convertible into oxide upon sintering (for example, lithium carbonate salt for lithium), wet blending predetermined amounts of oxides or oxide-forming compounds in a suitable dispersing medium such as water and various alcohols using suitable milling means such as a ball mill, and drying the mixture using suitable means such as a spray dryer. The mixture is calcinated at a temperature of the order of 600° to 800° C., and then milled in a suitable dispersing medium such as water and various alcohols to a particle size of up to 1 μm, for example, using suitable milling means such as a ball mill, attritor or the like. The powder is again dried, combined with a binder such as polyvinyl alcohol (PVA), granulated through a spray dryer, for example, and molded into a compact in a mold. The compact is sintered in air at a temperature of up to 950° C.

In addition to molded compacts of various shapes fabricated as above, the sintered ferrite material of the invention may be of powder form which is obtained by finely dividing the molded compact or sintering granules of calcined powder.

It is also possible to form a paste from necessary powders before it is sintered. A sintered material may be obtained by effecting calcination, wet milling and drying as above to form a powder mixture, adding a binder such as ethyl cellulose and a solvent such as terpineol and butylcarbinol to the powder mixture to form a paste. The paste is formed into a suitable shape or applied as a sheet, and then sintered.

When it is desired to add an additive such as niobium oxide and cobalt oxide, the additive may be added at the stage of blending stock materials or milling the calcined mixture.

The chip part of the present invention has a sintered ferrite material of the above-defined composition. No additional limitation is imposed on the chip part. The chip parts may be applicable as chip inductors, chip capacitors, composite LC parts, and the like.

The chip parts may be formed by any desired method, for example, by forming a green sheet from a paste or printing.

Figure 2:
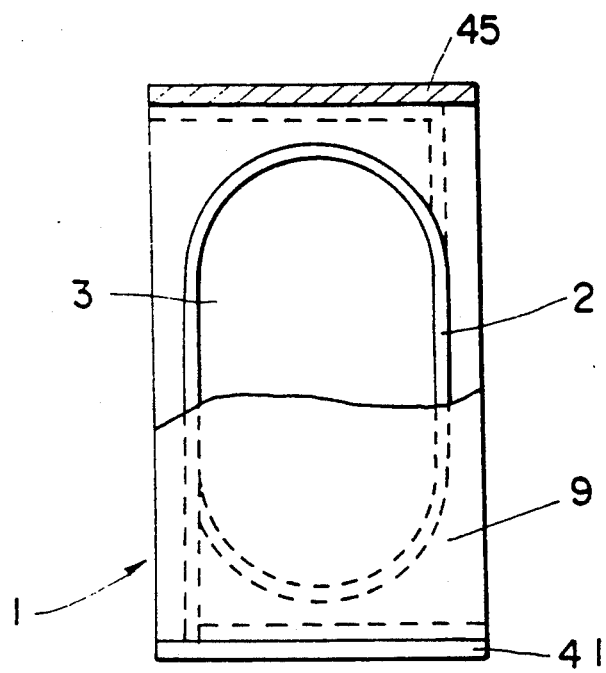
FIG. 2 is a partially cut-away schematic illustration of a chip inductor according to one embodiment of the present invention.

FIG. 2 shows a chip inductor according to one embodiment of the present invention. The chip inductor designated at 1 has a conventional well-known structure as shown in FIG. 2. This inductor may be prepared by a conventional method as by placing internal conductor layers 2 and ferrite magnetic layers 3 one on the other to form a ferrite magnetic laminate having an internal conductor of a predetermined pattern such as a spiral pattern and predetermined turns embedded therein, and connecting opposite ends of the internal conductor 2 to external electrodes 41 and 45.

The paste for forming the ferrite magnetic layers 3 of the chip inductor 1 may be prepared by the same method as used for the paste for forming sintered ferrite materials. The internal conductor-forming paste is well known and include Ag and Ag-Pd pastes, for example.

A chip inductor may be prepared by alternately applying the ferrite magnetic layer-forming paste and the internal conductor-forming paste onto a substrate of polyethylene terephthalate (PET), for example, by a printing or green sheet technique so as to define a predetermined pattern and firing at a temperature of up to about 950° C., preferably from 850° C. to about 930° C. for about ½ to about 4 hours.

The chip inductor thus prepared has high mechanical strength because the ferrite magnetic layers are formed from sintered ferrite of the specific composition. The sintering temperature necessary to obtain a sintered product with an equal density may be lower than in the prior art. The chip inductor of the present invention also has improved high-frequency response of electromagnetic properties.

The number of ferrite magnetic layers laminated may be chosen depending on the intended application although one to twenty layers are generally used. The thickness of each ferrite magnetic layer may be chosen depending on the intended application although the layer is generally about 10 to about 50 $\mu$m thick. The internal conductor 2 is generally formed from a metal such as Ag and Ag-Pd and has a thickness of about 10 to about 25 $\mu$m. The external electrodes 41, 45 may be similarly formed from a metal such as Ag and Ag-Pd and has a thickness of about 50 to about 500 $\mu$m.

Figure 3:
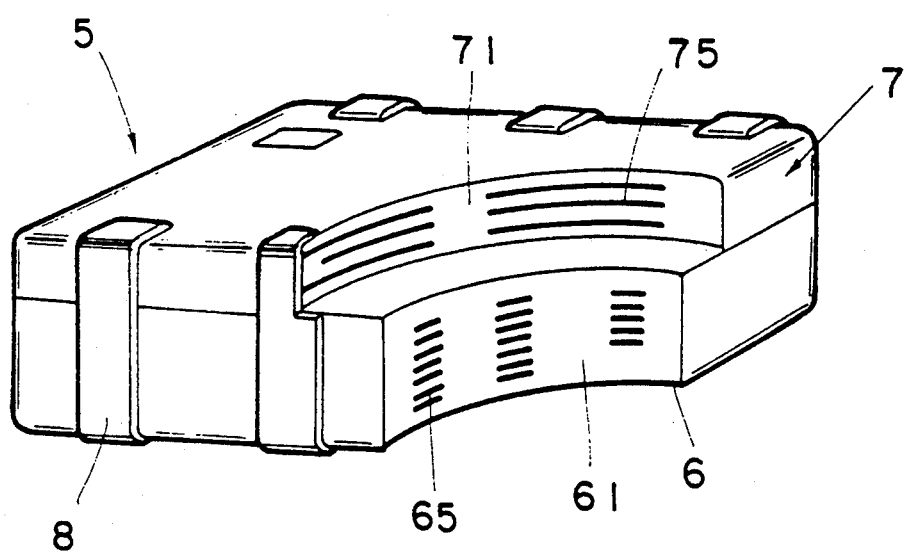
FIG. 3 is a partially cut-away perspective view of a composite LC part according to another embodiment of the present invention.

FIG. 3 shows a composite LC part according to another embodiment of the present invention. The composite LC part designated at 5 has an inductor section 6 and a capacitor section 7 integrated to each other.

The inductor section 6 is prepared by overlying ferrite magnetic layers 61 one on another while interposing internal conductor layers 65 of a predetermined pattern therebetween so as to keep conduction between consecutive conductor segments. The capacitor section 7 which is integrated to the inductor section 6 is prepared by alternately placing internal electrode layers 75 and ceramic dielectric layers 71.

In the example shown in FIG. 3, the inductor and capacitor sections 6 and 7 have a plurality of inductance (L) and capacitance (C), respectively. External electrodes 8 are connected so as to form a desired LC circuit with the inductor and capacitor sections.

The inductor section 6 of the composite LC part 5 has substantially the same structure as the chip inductor shown in FIG. 2. The inductor section can be obtained by sintering at a lower temperature, has improved frequency response and mechanical strength.

The material of which the dielectric layers 71 of the capacitor section 7 are made may be any desired dielectric material, but preferably titanium dioxide base dielectric material. The titanium dioxide base dielectric material used herein contains a major proportion of $TiO_2$ and may contain up to 10 mol % in total of NiO, CuO, $Mn_3O_4$, $Al_2O_3$, MgO or $SiO_2$ or a mixture thereof when a dielectric loss and a coefficient of linear expansion are taken into account.

The number of dielectric layers in the capacitor section 7 may be chosen depending on the intended application although one to ten layers are generally used. The thickness of each dielectric layer is generally about 50 to about 150 $\mu$m thick. The internal electrode in the capacitor section is generally formed from a metal such as Ag and Ag-Pd and has a thickness of about 5 to about 15 $\mu$m.

The number of ferrite magnetic layers 61 laminated in the inductor section 6 may be chosen depending on the intended application although one to twenty layers are generally used. The thickness of each ferrite magnetic layer may be chosen depending on the intended application the layer is generally about 10 to about 50 $\mu$m thick. The internal conductor 65 is generally formed from a metal such as Ag and Ag-Pd and has a thickness of about 10 to about 30 $\mu$m.

The external electrode 8 is generally formed from a metal such as Ag and Ag-Pd and has a thickness of about 50 to about 500 $\mu$m.

The composite LC part of the present invention may be prepared by any of conventional well-known printing and green sheet techniques. More particularly, pastes for ceramic magnetic layers, dielectric layers, internal electrodes and conductors are prepared and applied one by one onto a substrate of polyethylene terephthalate (PET) by a printing or green sheet technique.

Those pastes for forming dielectric layers and internal electrode layers of the capacitor section, internal conductor layers of the inductor section, and external electrodes may be prepared using suitable binder and solvent. The capacitor and inductor sections are prepared by applying the necessary pastes onto a substrate in laminate form by a printing or green sheet technique. The laminate is cut to a predetermined shape, separated from the substrate, and fired at a temperature of up to 950° C, for example, 850° to 930° C. The firing time is from about ½ to about 4 hours. At the end of firing, silver paste is baked to the laminate to form external electrodes.

The dimensions of the composite LC part thus prepared may be chosen depending on the intended application.

EXAMPLES

In order that those skilled in the art will better understand the practice of the present invention, examples of the present invention are given below by way of illustration and not by way of limitation.

EXAMPLE 1

A sintered ferrite material was prepared by selecting oxides corresponding to components (i) to (iv) except that lithium carbonate was selected for lithium component (ii), and wet blending the stock materials in a dispersing medium of water using a ball mill. The mixture was dried by a spray dryer, and calcined in air at 700° C. for 4 hours. The calcined mixture was then milled to a particle size of 1 μm or smaller in a ball mill, granulated into a granules of a particle size of about 150 μm through a spray dryer, molded into a compact in a press mold, and fired in air at 850° C. for 2 hours.

In this way, there were produced various sintered ferrite samples of toroidal shape having an inner diameter of 5 mm, an outer diameter of 11 mm, and a thickness of 2 mm. The composition of the sintered ferrite samples is shown in Table 1 where the mol percents of iron oxide, divalent metal oxide, lithium oxide, and tetravalent metal oxide reported are calculated as $Fe_2O_3$, M(II)O, $Li_2O$, and $M(IV)O_2$, respectively.

The samples obtained at a sintering temperature of 850° C. were measured for density (g/cm$^3$) and magnetic permeability at a frequency of 2 MHz. The results are shown in Table 1.

Samples having the same compositions as Sample Nos. 16 and 28 were sintered at different temperatures. Their density was measured. FIG. 1 is a diagram in which the density of these sintered samples is plotted as a function of sintering temperature.

TABLE 1

| | Ferrite Composition (mol %) | | | | | | | | Sintered at 850° C. | |
|---|---|---|---|---|---|---|---|---|---|---|
| | | | | | | | Tetravalent Metal Oxide | | | Magnetic |
| Sample No. | $Fe_2O_3$ | Divalent Metal Oxide | | | | $Li_2O$ | Ti | Sn | Ge | Density | Permeability |
| 1 | 50.95 | Ni | 48.00 | | | 0.75 | 0.30 | | | 4.80 | 6.0 |
| 2 | 50.95 | Ni | 48.00 | | | 0.75 | | 0.30 | | 4.85 | 6.5 |
| 3 | 50.95 | Ni | 48.00 | | | 0.75 | | | 0.30 | 4.80 | 6.5 |
| 4 | 50.95 | Ni | 48.00 | | | 0.75 | 0.15 | 0.15 | | 4.82 | 6.2 |
| 5 | 50.95 | Cu | 48.00 | | | 0.75 | 0.30 | | | 5.21 | 4.0 |
| 6 | 50.95 | Cu | 48.00 | | | 0.75 | | 0.30 | | 5.20 | 4.2 |
| 7 | 50.95 | Cu | 48.00 | | | 0.75 | | | 0.30 | 5.20 | 4.0 |
| 8 | 50.95 | Cu | 48.00 | | | 0.75 | | 0.15 | 0.15 | 5.19 | 4.1 |
| 9 | 50.95 | Cu | 48.00 | | | 0.75 | 0.10 | 0.10 | 0.10 | 5.22 | 4.1 |
| 10 | 50.95 | Ni | 20.00 | Cu | 28.00 | 0.75 | 0.30 | | | 5.21 | 14.2 |
| 11 | 50.95 | Ni | 20.00 | Cu | 28.00 | 0.75 | | 0.30 | | 5.20 | 13.5 |
| 12 | 50.95 | Ni | 20.00 | Cu | 28.00 | 0.75 | | | 0.30 | 5.21 | 13.4 |
| 13 | 50.95 | Ni | 20.00 | Cu | 28.00 | 0.75 | | 0.15 | | 5.21 | 14.0 |
| 14 | 50.95 | Ni | 20.00 | Cu | 28.00 | 0.75 | 0.15 | 0.15 | | 5.22 | 14.0 |
| 15 | 50.95 | Ni | 20.00 | Cu | 28.00 | 0.75 | 0.10 | 0.10 | 0.10 | 5.21 | 14.0 |
| 16 | 50.95 | Cu | 28.00 | Zn | 20.0 | 0.75 | 0.30 | | | 5.20 | 140.0 |
| 17 | 50.95 | Cu | 28.00 | Zn | 20.0 | 0.75 | | 0.30 | | 5.18 | 145.0 |
| 18 | 50.95 | Cu | 28.00 | Zn | 20.0 | 0.75 | | | 0.30 | 5.19 | 142.0 |
| 19 | 50.95 | Cu | 28.00 | Zn | 20.0 | 0.75 | 0.15 | 0.15 | | 5.20 | 143.0 |
| 20 | 50.95 | Cu | 28.00 | Zn | 20.0 | 0.75 | | 0.15 | 0.15 | 5.19 | 145.0 |
| 21* | 55.90 | Cu | 26.80 | Zn | 10.0 | 7.00 | 0.30 | | | 4.55 | 62.0 |
| 22* | 55.90 | Ni | 10.00 | Zn | 26.8 | 7.00 | 0.15 | | 0.15 | 4.40 | 7.3 |
| 23* | 49.95 | Cu | 30.00 | Zn | 20.2 | | 0.30 | | | 4.40 | 81.0 |
| 24* | 49.95 | Ni | 49.75 | | | | | 0.15 | 0.15 | 3.85 | 2.2 |
| 25* | 52.30 | Ni | 46.30 | | | 1.40 | | | | 3.82 | 2.4 |
| 26* | 52.30 | Cu | 46.30 | | | 1.40 | | | | 4.45 | 2.2 |
| 27* | 52.30 | Ni | 20.30 | Cu | 26.0 | 1.40 | | | | 4.50 | 8.2 |
| 28* | 52.30 | Cu | 26.00 | Zn | 20.3 | 1.40 | | | | 4.55 | 62.0 |
| 29* | 48.31 | Ni | 47.22 | | | 1.47 | 3.00 | | | 3.90 | 2.3 |
| 30* | 48.31 | Zn | 47.22 | | | 1.47 | 3.00 | | | 3.90 | 1.0 |

EXAMPLE 2

The procedure of Example 1 was repeated except that the sintering temperature was raised to 900° C. The resulting samples were examined by similar tests.

The composition and test results of sintered ferrite samples are shown in Table 2.

TABLE 2

| | Ferrite Composition (mol %) | | | | | | | | Sintered at 900° C. | |
|---|---|---|---|---|---|---|---|---|---|---|
| | | | | | | | Tetravalent Metal Oxide | | | Magnetic |
| Sample No. | $Fe_2O_3$ | Divalent Metal Oxide | | | | $Li_2O$ | Ti | Sn | Ge | Density | Permeability |
| 201 | 50.95 | Ni | 48.00 | | | 0.75 | 0.30 | | | 4.95 | 6.80 |
| 202 | 50.95 | Ni | 48.00 | | | 0.75 | | 0.30 | | 5.00 | 7.00 |
| 203 | 50.95 | Ni | 48.00 | | | 0.75 | 0.15 | 0.15 | | 5.01 | 6.80 |
| 204 | 50.95 | Cu | 48.00 | | | 0.75 | 0.30 | | | 5.36 | 5.20 |
| 205 | 50.95 | Cu | 48.00 | | | 0.75 | | 0.30 | | 5.34 | 5.10 |
| 206 | 50.95 | Cu | 48.00 | | | 0.75 | | | 0.30 | 5.35 | 5.00 |
| 207 | 50.95 | Cu | 48.00 | | | 0.75 | 0.15 | | 0.15 | 5.36 | 5.10 |
| 208 | 50.95 | Cu | 48.00 | | | 0.75 | 0.10 | 0.10 | 0.10 | 5.35 | 5.10 |
| 209 | 50.95 | Ni | 20.00 | Cu | 20.0 | 0.75 | 0.30 | | | 5.37 | 18.60 |
| 210 | 50.95 | Ni | 20.00 | Cu | 20.0 | 0.75 | | 0.30 | | 5.36 | 18.10 |

TABLE 2-continued

| | Ferrite Composition (mol %) | | | | | | | | Sintered at 900° C. | |
|---|---|---|---|---|---|---|---|---|---|---|
| | | | | | | | Tetravalent Metal Oxide | | | Magnetic |
| Sample No. | Fe₂O₃ | Divalent Metal Oxide | | | | | Li₂O | Ti | Sn | Ge | Density | Permeability |

| Sample No. | Fe₂O₃ | | Divalent Metal Oxide | | | | Li₂O | Ti | Sn | Ge | Density | Permeability |
|---|---|---|---|---|---|---|---|---|---|---|---|---|
| 211 | 50.95 | Ni | 20.00 | Cu | 20.0 | | 0.75 | | | 0.30 | 5.35 | 18.00 |
| 212 | 50.95 | Ni | 20.00 | Cu | 20.0 | | 0.75 | | 0.15 | 0.15 | 5.36 | 18.00 |
| 213 | 50.95 | Ni | 20.00 | Cu | 20.0 | | 0.75 | 0.10 | 0.10 | 0.10 | 5.35 | 18.20 |
| 214 | 50.95 | Ni | 28.00 | Zn | 20.0 | | 0.75 | 0.30 | | | 5.00 | 18.20 |
| 215 | 50.95 | Ni | 28.00 | Zn | 20.0 | | | | 0.30 | | 4.95 | 17.90 |
| 216 | 50.95 | Ni | 28.00 | Zn | 20.0 | | 0.75 | | | 0.30 | 5.01 | 18.00 |
| 217 | 50.95 | Ni | 28.00 | Zn | 20.0 | | 0.75 | 0.15 | 0.15 | | 4.98 | 17.80 |
| 218 | 49.85 | Ni | 15.70 | Cu | 13.8 | Zn 20.2 | 0.30 | 0.15 | | | 5.37 | 240.00 |
| 219 | 49.85 | Ni | 15.70 | Cu | 13.8 | Zn 20.2 | 0.30 | | 0.15 | | 5.38 | 2.45 |
| 220 | 49.85 | Ni | 15.70 | Cu | 13.8 | Zn 20.2 | 0.30 | | | 0.15 | 5.35 | 240.0 |
| 221 | 49.85 | Ni | 15.70 | Cu | 13.8 | Zn 20.2 | 0.30 | 0.075 | 0.075 | | 5.36 | 243.0 |
| 222 | 49.85 | Ni | 15.70 | Cu | 13.8 | Zn 20.2 | 0.30 | 0.05 | 0.05 | 0.05 | 5.36 | 243.0 |
| 223* | 49.90 | Ni | 50.00 | | | | | 0.10 | | | 4.60 | 3.1 |
| 224* | 49.70 | Cu | 50.10 | | | | | 0.20 | | | 4.95 | 3.8 |
| 225* | 49.80 | Ni | 20.00 | Cu | 30.1 | | | 0.10 | | | 4.90 | 15.0 |
| 226* | 63.60 | Ni | 9.10 | Cu | 9.0 | Zn 11.0 | 7.00 | 0.15 | | 0.15 | 4.80 | 140.0 |
| 227* | 63.60 | Ni | 29.10 | | | | 7.00 | 0.30 | | | 4.70 | 5.0 |
| 228* | 63.60 | Cu | 29.10 | | | | 7.00 | 0.30 | | | 4.80 | 4.2 |
| 229* | 63.60 | Ni | 10.10 | Cu | 19.0 | | 7.00 | 0.30 | | | 4.80 | 11.2 |
| 230* | 51.49 | Ni | 47.76 | | | | 0.75 | | | | 4.80 | 5.1 |
| 231* | 52.30 | Cu | 46.30 | | | | 1.40 | | | | 4.80 | 4.2 |
| 232* | 52.30 | Ni | 20.20 | Cu | 26.0 | | 1.40 | | | | 4.78 | 12.4 |
| 233* | 52.30 | Ni | 26.00 | Zn | 20.3 | | 1.40 | | | | 4.80 | 12.5 |
| 234* | 52.30 | Ni | 16.00 | Cu | 14.0 | Zn 16.3 | 1.40 | | | | 4.68 | 86.0 |
| 235* | 48.31 | Ni | 47.22 | | | | 1.47 | 3.00 | | | 4.60 | 3.2 |
| 236* | 48.31 | Zn | 47.22 | | | | 1.47 | 3.00 | | | 4.55 | 1.0 |

*Comparison

As seen from Tables 1 and 2 and FIG. 1, the sintered ferrite materials of the present invention had a sufficiently high density and excellent mechanical strength even when they had been sintered at relatively low temperatures of 850° C. and 900° C. They exhibited not only excellent mechanical strength, but also improved electromagnetic properties as demonstrated by higher magnetic permeability than the conventional samples.

EXAMPLE 3

A ferrite sample having the same composition as sintered ferrite sample No. 218 of Example 2 was prepared by the same procedure as in Example 1 until it was calcined. The calcined mixture was wet milled and then dried into a powder having an average particle size of about 0.1 μm through a spray dryer. The powder was dispersed in terpineol along with a predetermined amount of ethyl cellulose to form a paste.

Using the ferrite-forming paste as a magnetic layer and Ag paste as an internal conductor layer, a chip inductor of 4.5 mm × 3.2 mm × 1.0 mm as shown in FIG. 2 was fabricated by a lamination-by-printing method. Each ferrite layer was 40 μm thick, the conductor had a thickness of 20 μm and a line width of 300 μm, and the coil was of an elliptic shape having a major diameter of 10 mm and a minor diameter of 1.7 mm and a stack of ten turns. The external electrodes were formed from Ag-Pd paste. Sintering was performed at 870° C. for 2 hours.

The thus sintered chip inductor had a very high density and excellent mechanical strength.

The chip inductor had very good electrical properties as demonstrated by an inductance of 35 μH and a Q value of 63.

EXAMPLE 4

Titanium oxide TiO₂ having a particle size of 0.01 to 0.1 μm was calcined at 750° C. into free-flowing granules, milled in a ball mill, and dried into a powder having a particle size of 0.1 μm through a spray dryer. The powder was dispersed in terpineol along with a predetermined amount of ethyl cellulose and mixed in a HENSCHEL mixer to form a paste for capacitor dielectric layers.

A stack was prepared by a printing method using the above-prepared paste to form capacitor dielectric layers, Ag-Cu paste to form internal electrodes, and the same ferrite and Ag pastes as in Example 3 to form inductor and conductor layers.

The inductor section consisted of 8 laminated layers each having a thickness of 40 μm and the capacitor section consisted of 2 laminated layers each having a thickness of 100 μm. The internal electrodes and conductor layers each had a thickness of 20 μm. At the end of lamination by printing, the assembly was sintered at 870° C. for 2 hours.

The assembly was allowed to cool down, obtaining a composite LC part of 4.5 mm × 3.2 mm × 1.5 mm which included four inductance elements and three capacitor elements to form an LC filter circuit at 4 MHz or higher.

The thus sintered composite LC part had a very high density and excellent mechanical strength. It showed a low transmission loss when examined by a transmission measuring set. It had improved electric filter properties.

The sintered ferrite material of the present invention has the advantage that it can be obtained by sintering at a relatively low temperature of up to 950° C. Low temperature sintering is very advantageous to save manufacturing cost.

For example, Ag is usually used as the internal conductor of a chip inductor. The use of the sintered ferrite material of the present invention allows the commonly used pure silver conductor to be replaced by a less expensive conductor of Ag having up to 5% of Cu added thereto and having a lower melting point.

Also advantageously the sintered ferrite material of the present invention has sufficiently high density and mechanical strength even though it has been sintered at a relatively low temperature. It exhibits improved electromagnetic properties including magnetic permeability.

Chip parts comprising such a sintered ferrite material and ferrite products as ordinary sintered material per se also have the advantages of possible low-temperature sintering, high mechanical strength, and improved electromagnetic properties.

We claim:

1. A chip element comprising a sintered ferrite material produced by the process comprising:

mixing 45 to 52 mol % calculated as $Fe_2O_3$ of iron oxide, a mixture of 25 to 35 mol % copper oxide and 15 to 25 mol % zinc oxide, calculated as CuO and ZnO, respectively, 0.01 to 5.0 mol % calculated as $Li_2O$ of lithium oxide, 0.01 to 0.5 mol % as $M(IV)O_2$ of an oxide of a tetravalent metal M(IV) wherein M(IV) is at least one element selected from the group consisting of titanium, tin and germanium, and sintering the ferrite material at a temperature of up to 950° C., wherein the final composition has a spinel structure, and an electrode comprised of Ag.

2. A chip element comprising a sintered ferrite material produced by the process comprising:

mixing 45 to 52 mol % calculated as $Fe_2O_3$ of iron oxide, a mixture of 10 to 25 mol % nickel oxide, 8 to 20 mol % copper oxide and 10 to 30 mol % zinc oxide, calculated as NiO, CuO, ZnO, respectively, 0.01 to 5.0 mol % calculated as $Li_2O$ of lithium oxide, 0.01 to 0.5 mol % as $m(IV)O_2$ of an oxide of a tetravalent metal M(IV) wherein M(IV) is at least one element selected from the group consisting of titanium, tin and germanium, and sintering the ferrite material at a temperature of up to 950° C., wherein the final composition has a spinel structure, and an electrode comprised of Ag.

3. The chip element of claims 1 or 2, wherein the ferrite material has been sintered at a temperature of from 850° C. to 930° C.

4. The chip element of claims 1 or 2 wherein the final sintered ferrite material comprises 0.3–5.0 mol % calculated as $Li_2O$ of lithium oxide.

5. The chip element of claims 1 or 2, wherein in the sintered ferric material M(IV) is titanium and the final composition comprises 0.1–0.5 mol % calculated as $M(IV)O_2$ of titanium oxide.

6. The chip element of claims 1 or 2, wherein said chip is comprised of 1 to 20 layers of said ferrite material, the thickness of each ferrite layer ranging from about 10–50 μm thick and an internal conductor comprised of Ag having a thickness of about 10–25 μm.

* * * * *